United States Patent [19]
Fellows

[11] Patent Number: 6,023,051
[45] Date of Patent: Feb. 8, 2000

[54] EASILY CLEANABLE FLAVOR PRODUCING PLATES FOR ELECTRICALLY HEATED BARBECUE GRILLS AND THEIR USE IN RANGES OR COOKTOPS

[76] Inventor: Margie Ann Fellows, 8314 Greenwood Ave. N. #13, Seattle, Wash. 98103-4238

[21] Appl. No.: 08/937,835

[22] Filed: Sep. 26, 1997

[51] Int. Cl.⁷ .............................. H05B 3/68; A47J 37/08; A47J 37/00; F24C 3/00
[52] U.S. Cl. .......................... 219/450.1; 99/400; 99/444; 126/25 R; 126/39 J
[58] Field of Search .............................. 219/443.1, 450.1, 219/455.11, 455.12; 99/400, 401, 422, 425, 444, 445, 447; 126/41 R, 39 BA, 39 J, 39 K, 92 A, 92 B, 25 R

[56] References Cited

U.S. PATENT DOCUMENTS

| | | |
|---|---|---|
| 3,444,805 | 5/1969 | Happel et al. . |
| 3,474,724 | 10/1969 | Jenn . |
| 3,589,269 | 6/1971 | Weir . |
| 3,745,912 | 7/1973 | Field . |
| 3,797,375 | 3/1974 | Cerola ................................. 219/450.1 |
| 4,290,408 | 9/1981 | Juett et al. ............................ 126/41 R |
| 4,378,729 | 4/1983 | Pierick . |
| 4,384,513 | 5/1983 | Pierick . |
| 4,403,597 | 9/1983 | Miller .................................... 126/41 R |
| 4,508,097 | 4/1985 | Berg . |
| 4,727,853 | 3/1988 | Stephen et al. . |
| 4,862,795 | 9/1989 | Hawkins . |
| 4,917,960 | 4/1990 | Hornberger et al. . |
| 4,962,694 | 10/1990 | Graver . |
| 5,001,970 | 3/1991 | Graver . |
| 5,117,747 | 6/1992 | Kuechler . |
| 5,176,067 | 1/1993 | Higgins . |
| 5,198,491 | 3/1993 | Honda et al. . |
| 5,250,356 | 10/1993 | Batzar . |
| 5,259,299 | 11/1993 | Ferraro . |
| 5,277,106 | 1/1994 | Raymer et al. . |
| 5,283,121 | 2/1994 | Bordner . |
| 5,287,799 | 2/1994 | Pickering et al. . |
| 5,355,868 | 10/1994 | Haen . |
| 5,455,102 | 10/1995 | Tsai . |

Primary Examiner—Sang Paik
Attorney, Agent, or Firm—Fred H. Roberts

[57] ABSTRACT

The flavor producing plate, resembling an inverted egg carton, has a smooth surface topography comprising symmetrical, convex protuberances disposed in a symmetrical array. Excess food drippings are drained away through through-openings (having diameters greater than 12 millimeters) located within the interstices between protuberances. Plate cleanability is improved by coating the surface with an anti-stick coating of poly (tetrafluoroethylene) (PTFE) preferably containing reinforcing particles that enhance the coating's scrub resistance. The plates can be made from cast, wrought, or sintered metal such as iron, aluminum, copper, or bronze. Plate mass provides an areal heat capacity ($Q_A$) in the range of from 500 to 3,000 Joules per square centimeter thereby retaining the heat sink and heat modulating functions of prior art plates. Grill assemblies including the coated plate, can be regulated to confine the operating temperature at the plate upper surface within a "temperature window" that is above the pyrolysis temperature of food drippings but below the decomposition temperature of PTFE.

8 Claims, 5 Drawing Sheets

EASILY CLEANABLE FLAVOR PRODUCING PLATES FOR ELECTRICALLY HEATED BARBECUE GRILLS AND THEIR USE IN RANGES OR COOKTOPS

FIELD OF THE INVENTION

The present invention relates to barbecue grills. Specifically to easily cleanable flavor producing plates interposable beneath the electric heating element(s) and above the drip pans of modular grill assemblies. Such assemblies comprise one of several interchangeable modules included in ranges and cooktops having downdraft exhaust systems.

BACKGROUND OF THE INVENTION

Barbecued food has long been prized for its savory, mouth-watering flavor-especially wood smoke flavored "pit" barbecue that is slow cooked at low temperature. Details of the pit process are described in U.S. Pat. No. 3,589,269, disclosing an automatic barbecue oven including a pyrolytic smoke forming surface that provides smoke to enhance the flavor and aroma of the food. Eating pit barbecue evokes memories of communal outdoor cooking over open fires while picnicking or camping thus adding to the enjoyment of the experience.

Consequently, there is an ongoing motivation in the art to move barbecue cooking indoors and to reduce cooking times (through use of higher temperatures). This motivation drives the ongoing re-design and development of electrically powered barbecue grills. Indoor, smokeless grills are common in the art; however, food cooked on smokeless grills has the appearance but lacks the aroma and flavor of outdoor barbecue. Smoke free, high temperature indoor barbecue cooking that more completely captures the essence of the pit barbecue process became possible with the advent of downdraft ranges and cooktops as described U.S. Pat. Nos. 3,444,805, 3,474,724, 3,745,912, 4,862,795, and 5,287,799.

The components in grill assemblies designed for use in downdraft ranges and cooktops are gravity drained and therefore vertically stacked. In such an arrangement, drippings, rendered from food during cooking, drain from a food rack positioned uppermost in the stack, through electric heating elements positioned beneath the food rack, and collect in a drip pan positioned beneath the heating elements. Radiant heat emitted from the bottom of the heating elements can heat grease collected in the drip pan to its flash point. The occurrence of flash fires, can be reduced by insertion of heat sink plates (as shown in U.S. Pat. No. 3,745,912) or reflector pans (as shown in U.S. Pat. No. 4,862,795) beneath the heating elements. Heat sink plates usually contain one or more through openings to expedite the rapid drainage of drippings through the plate into the drip pan. Furthermore, the upward facing surfaces of the plates are sloped to drain drippings toward the openings.

Heat sink plates also beneficially enhance production of savory, aerosols (smoke) within the barbecue by aiding violent boiling and spattering associated with the pyrolysis of food drippings as they flow over the hot surface of the plate enroute to the drip pan. The plate also provides a convenient repository for optional placement of various types of wood chips within the barbecue.

From the foregoing, it is easy to see that during use heat sink plates become covered with charred residues that plug the through openings and make heat sink plates difficult to thoroughly clean. The residues, which quickly become foul smelling, stick tenaciously to the heat sink plate and reduce heat flow to the surface of the plates thus impeding pyrolysis of drippings. Often prolonged soaking in warm detergent-water solution followed by vigorous scrubbing with steel wool, ScotchBrite™, or a brass bristle grill brush fails to completely remove the char.

Applicant is not aware of any flavor producing or heat sink plates designed for use beneath electric heating elements that have anti-stick coatings of Teflon™ applied thereto. However, the prior art does describe barbecue grills having Teflon™ coated components like food racks and drip bars that are located well away from heat sources. For example, U.S. Pat. No. 5,259,299 describes a non-stick outdoor cooking unit having Teflon® coated cooking surfaces. The unit is designed and constructed for continuous service at temperatures of 500 degrees Fahrenheit. The design precludes direct flame contact and overheating of the Teflon® coating. The patent further describes flu like symptoms (sometimes called "polymer fume fever") that have been reported by people breathing Teflon® decomposition products.

SUMMARY OF THE INVENTION

Applicant found it difficult to clean prior art heat sink plates taken from a Jenn Air Model Al 151 Grill Assembly after use. During a particularly frustrating plate cleaning session, while scrubbing the dirty plates with a brass bristle grill brush, applicant observed that the grooves and valleys covering the plate surface were too small and didn't have the right shape to get the brush into making the plate impossible to clean. Upon making these observations, applicant conceived the following novel solution to the plate cleanability problem. The plates should have: 1) Teflon® coated surfaces, 2) wider grooves and generally smoother, more symmetrical surface features, and 3) larger holes (through openings).

Accordingly, the present invention provides an easily cleanable flavor producing plate that retains the heat sink and heat modulating means of the prior art. However, the inventive plate does away with the narrow valleys and craggy, steep-walled surface features of prior art plates by providing plates with smooth surface topographies comprising symmetrical, convex protuberances disposed in symmetrical arrays. Excess food drippings are drained away by through-openings (having diameters greater than 12 millimeters) located within the interstices existing between protuberances. Optionally, the inventive plates can be coated with an anti-stick coating of poly(tetrafluoroethylene) (PTTE) to further enhance the release of char from the plate surface during cleaning. For example, the surface topography of the inventive plate could resemble that of an inverted egg carton.

The inventive plates can be made from cast, wrought, or sintered metal such as iron, aluminum, copper, or bronze for example, and should be of sufficient mass to provide an areal heat capacity ($Q_A$) in the range of from 500 to 3,000 joules per square centimeter.

Especially preferred embodiments of the invention include anti-stick coatings of PTFE on the plate surface to further improve cleanability. The PTFE coatings can contain reinforcing particles rendering them more scrub resistant. Exemplary reinforcing particles include, but are not limited to, silica, alumina, mica, titanium dioxide, glass beads, carbon black, and PTFE powder.

The invention extends to barbecue grill assemblies utilizing the inventive flavor producing plates of the embodiments disclosed hereinabove and to ranges and cooktops containing such grill assemblies.

Also envisioned as falling within the scope of the invention are grills having means to regulate the temperature at the surface of the inventive flavor producing plates within desired operating ranges, i.e. above the pyrolysis temperature of food drippings but below the decomposition temperature of PTFE coatings.

SUMMARY OF THE DRAWINGS

While the novel aspects of the invention are set forth with particularity in the appended claims, the invention both as to organization and content will be better understood and appreciated from the following detailed description taken in conjunction with the drawings in which:

DETAILED DESCRIPTION AND PREFERRED EMBODIMENTS

Figure 1A:
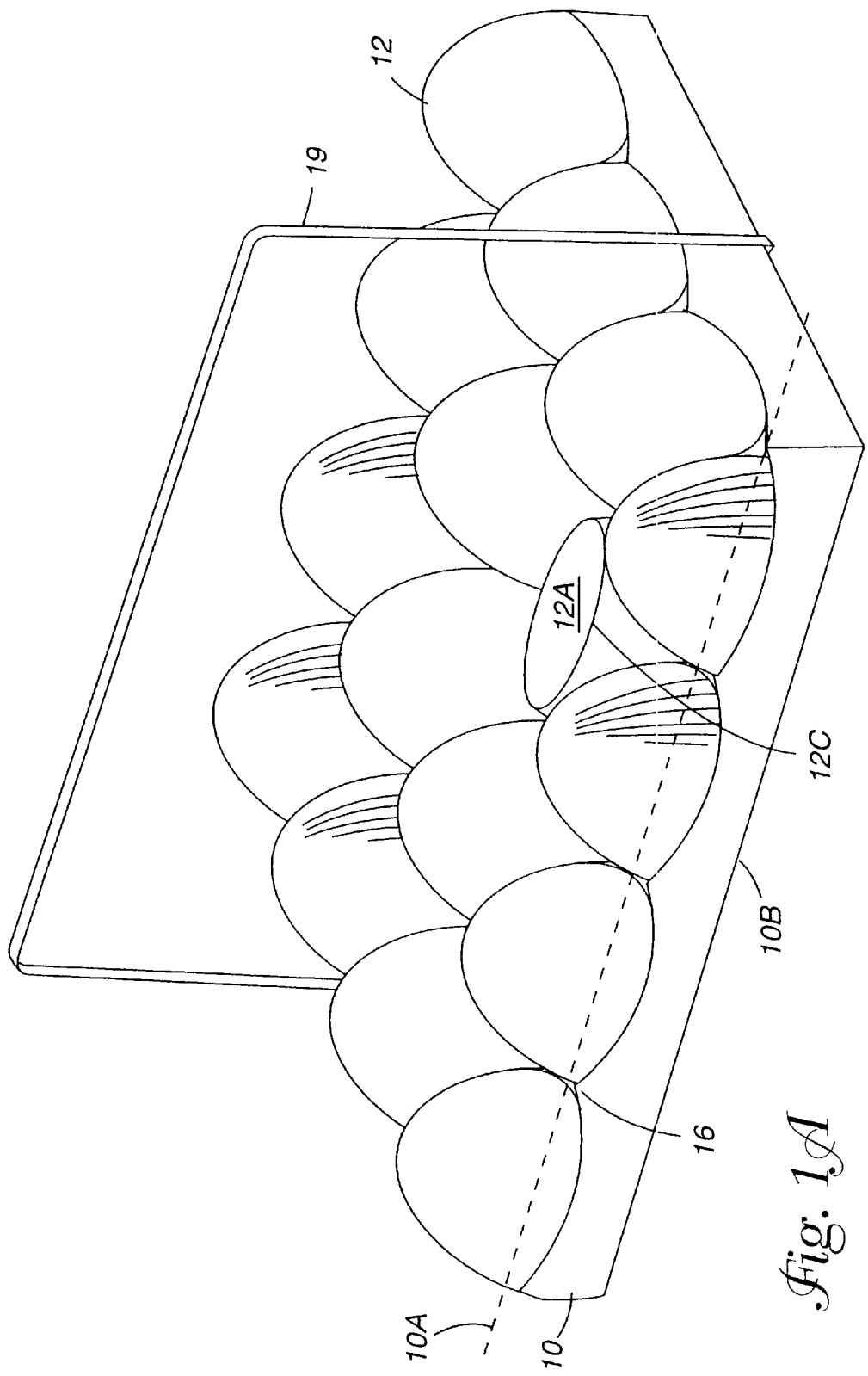
FIG. 1A shows a perspective view of a flavor producing plate of the present invention wherein the upper major surface is covered with ellipsoidal protuberances disposed on an overlapping square array (vertical scale is expanded).
Figure 1D:
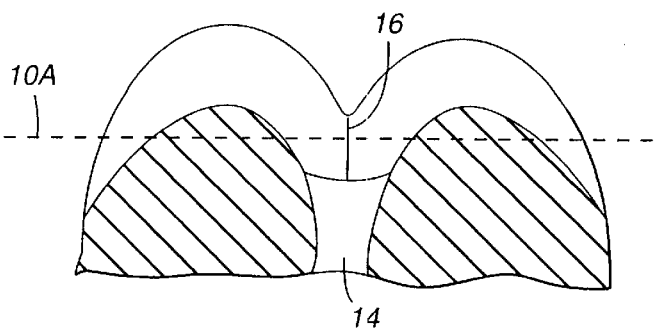
FIG. 1D shows a side view of FIG. 1B along section line B—B (vertical scale is expanded).
Figure 1B:
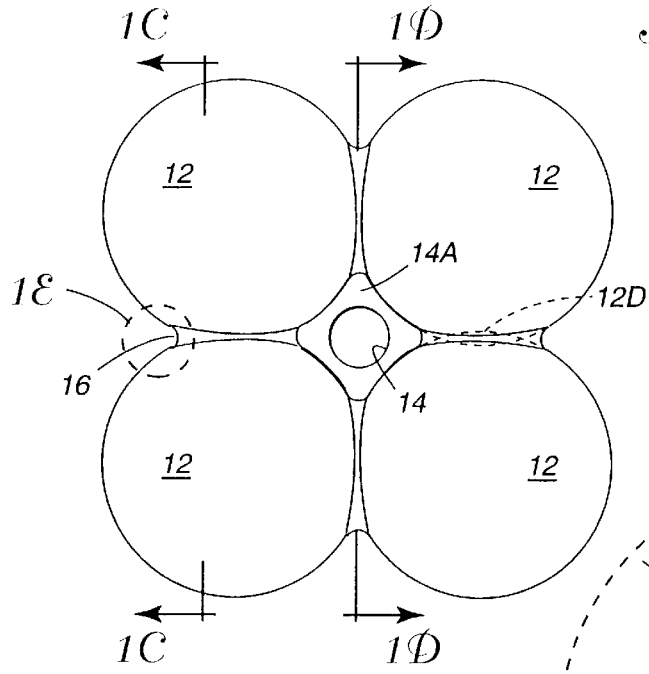
FIG. 1B shows a top view of a broken away region of the plate shown in FIG. 1A.
Figure 1E:
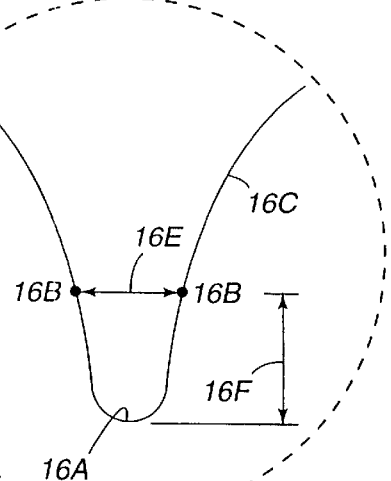
FIG. 1E shows a front view of the region enclosed in box C (vertical and horizontal scales are expanded).

Referring now to the drawings in detail. FIGS. 1A through 1E show a preferred embodiment of the invention comprising a highly symmetrical flavor producing plate in which the vertical dimension is expanded. Perspective view 1A shows that the inventive plate is comprised of substrate (10) having upper major surface (10A) and lower major surface (10B). Metals suitable for forming substrate (10) include, but are not limited to, iron, aluminum, copper, and bronze. The metals may be cast, wrought, or sintered, and are readily available from a large number of commercial sources. Substrate (10) is of sufficient thickness to provide a substrate having an areal heat capacity $Q_A$ exceeding 500 joules per square centimeter.

Upper major surface (10A) is covered with convex protuberances (12). A protuberance is defined as something projecting out from a surrounding or adjacent surface often as a rounded mass, or as a rounded raised region bulging out of a surface. Preferably protuberances have downward sloping surfaces whose cross-sectional contours yield arcuate plane curves as shown at (12B).

The downward sloping protuberance surfaces promote the formation of films from food drippings falling thereon. Preferably, the slopes of the surfaces do not exceed 3/1, more preferably do not exceed 2/1, and most preferably do not exceed 1/1 (about 72 degrees, about 64 degrees, and about 45 degrees respectively).

Increasing the symmetry and smoothness of protuberances (12) is believed to improve plate cleanability. Therefore, protuberances formed from surfaces of revolution are preferred and include, but are not limited to, spherical caps, ellipsoidal caps, parabolic caps, spherical segments, ellipsoidal segments, parabolic segments, and frustro-conical segments. Protuberances formed from surfaces generated by revolution of arcuate plane curves are more preferred. The protuberance shown as the ellipsoidal segment (12A) has a planar face with exterior edge (12C). Preferably the exterior edges at the planar faces of segmented protuberances are rounded. These roundings preferably have radii of curvatures exceeding 1 millimeter, more preferably exceeding 2 millimeters, and most preferably exceeding 4 millimeters.

Furthermore, the arrangement of protuberances covering the upper major surface also affects cleanability. For example, a square packed array of protuberances (shown in FIG. 1A through E and FIG. 2) is believed to be preferred because it improves the effectiveness of cleaning brush strokes in directions parallel to the length or width of the plate. However, random packing of protuberances and other packed arrays such as the hexagonal closest packed array are contemplated as falling within the scope of the present invention.

Packing density also affects plate cleanability. When protuberances are packed close together in dense arrays, cleanability is somewhat reduced because the overall size of the open areas between protuberances is reduced. In dense arrays, the bases of the protuberances overlap as shown at (12D). This overlap results in protuberances with individually defined tops (12E) but with bases (12D) that merge together. The contours defining the intersection of said merged protuberances further define the location of crevices or crannies (16) having convex cross-sections. Crannies provide another means between protuberances. Crannies have convex sides (16C) that can be very difficult to clean out if the bottoms (16A) are not rounded. Therefore, rounded crannies preferably have radii of curvatures exceeding 2 millimeters, more preferably exceeding 4 millimeters, and most preferably exceeding 5 millimeters. Furthermore, to assure ample access to crannies for cleaning purposes the width-to-depth ratio of crannies preferably exceeds 1.5, more preferably exceeds, 2.0, and most preferably exceeds 2.5 and the slope at the inflection points (16B) where the concave roundings join the convex cranny walls are in the range of from 1/10 to 3/1.

Inclusion of optional heating element support (19), which also serves as a handle, facilitates removal, cleaning, and reinstallation of the plates.

Figure 1C:
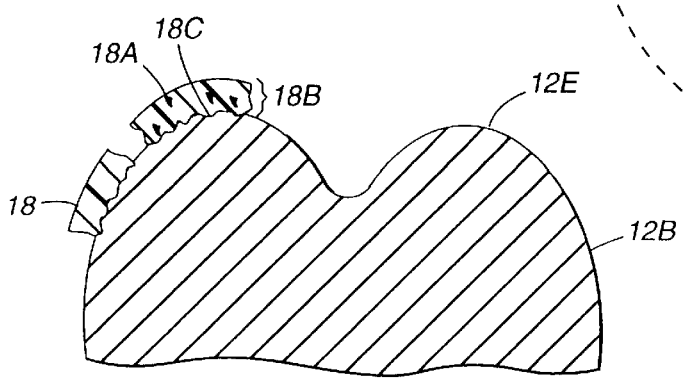
FIG. 1C shows a side view of FIG. 1B along section line A—A (vertical scale is expanded). The thickness of the PTFE coating is greatly expanded.

Greatly expanded region (18B) of FIG. 1C shows PTFE coating (18) more clearly. Commercially available PTFE containing coatings are known under the trade names Teflon®, Silverstone®, and T-Fal™. Reinforcing particles (18A) are shown in the broken away upper portion of the coating. Reinforcing particles render the coating more scrub and abrasion resistant. The particles are also reactive and/or adsorptive to varying degrees and therefore scavenge minor amounts of volatile products produced upon heating PTFE coatings. Suitable reinforcing particles include but are not limited to silica, alumina, mica, titanium dioxide, glass beads, carbon black, and PTFE powder. However, PTFE powder does not act as a scavenger.

Figure 2:
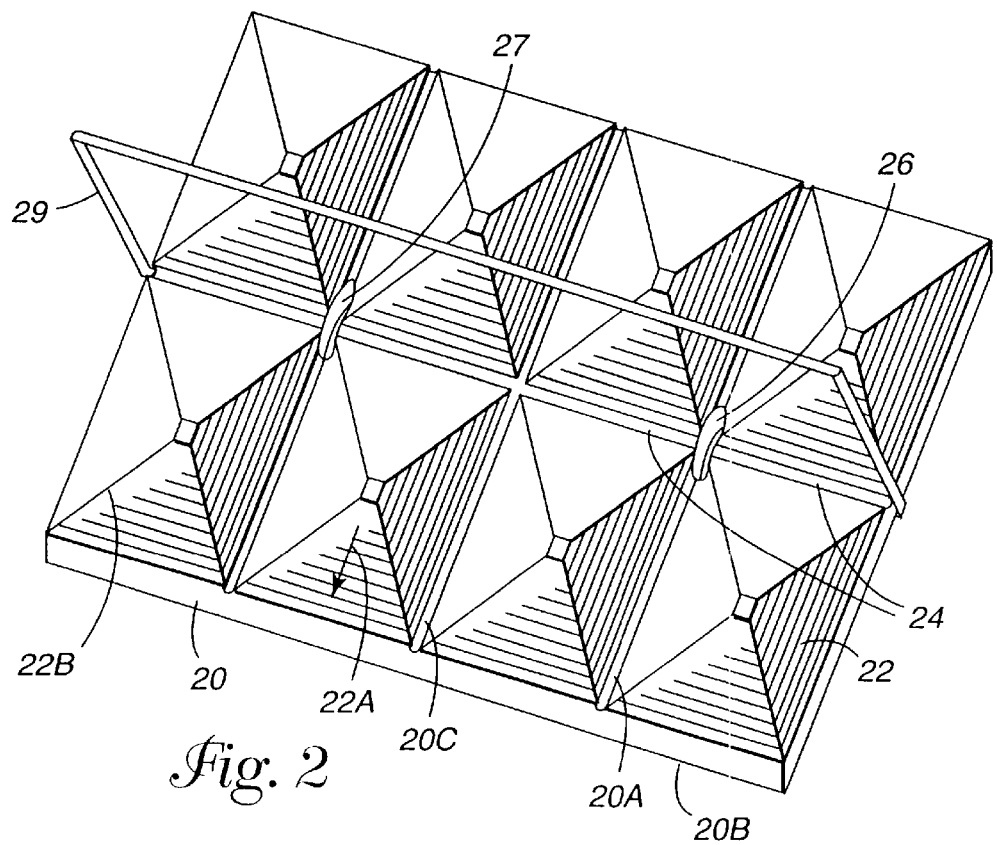
FIG. 2 shows a flavor producing plate of the invention wherein the upper major surface is covered with pyramidal shaped protuberances disposed on a non-overlapping square array (vertical scale is expanded).

FIG. 2 shows an extension of the invention to a lower symmetry embodiment comprising a flavor producing plate having a substrate (20) with upper major surface (20A) and lower major surface (20B). The upper major surface is covered with a non-overlapping square array of protuberances having planer surfaces (22) (in this special case truncated pyramids). Downward sloping channels (24) terminate at interior through openings (26), or major surface edges (20C). Optional electric heating element support (29) is also shown.

In embodiments of the invention having protuberances with substantially planer downward sloping surfaces (22A), the slopes of the surfaces do not exceed 3/1, more preferably do not exceed 2/1, and most preferably do not exceed 1/1. The angular ridges (22B) formed by the intersection of the planar surfaces (22A) are rounded having radii of curvatures in the range of from 2 to 5 millimeters.

Through openings (26) have major dimension (27) in the range of from about 12 to about 30 millimeters, more preferably in the range of from about 14 to 25 millimeters, and most preferably from about 15 to about 25 millimeters. Major dimension (27) is the diameter when the openings are circular, the major axis when elliptical, the longest altitude when triangular, the longest diagonal when quadrilateral, etc. When the major dimension is less than about 10 millimeters, the openings are easily clogged with char, and when larger than about 30 millimeters the openings allow too much radiant heat to pass through the plate into drip pan (48) increasing the risk of grease fires.

Figure 3A:
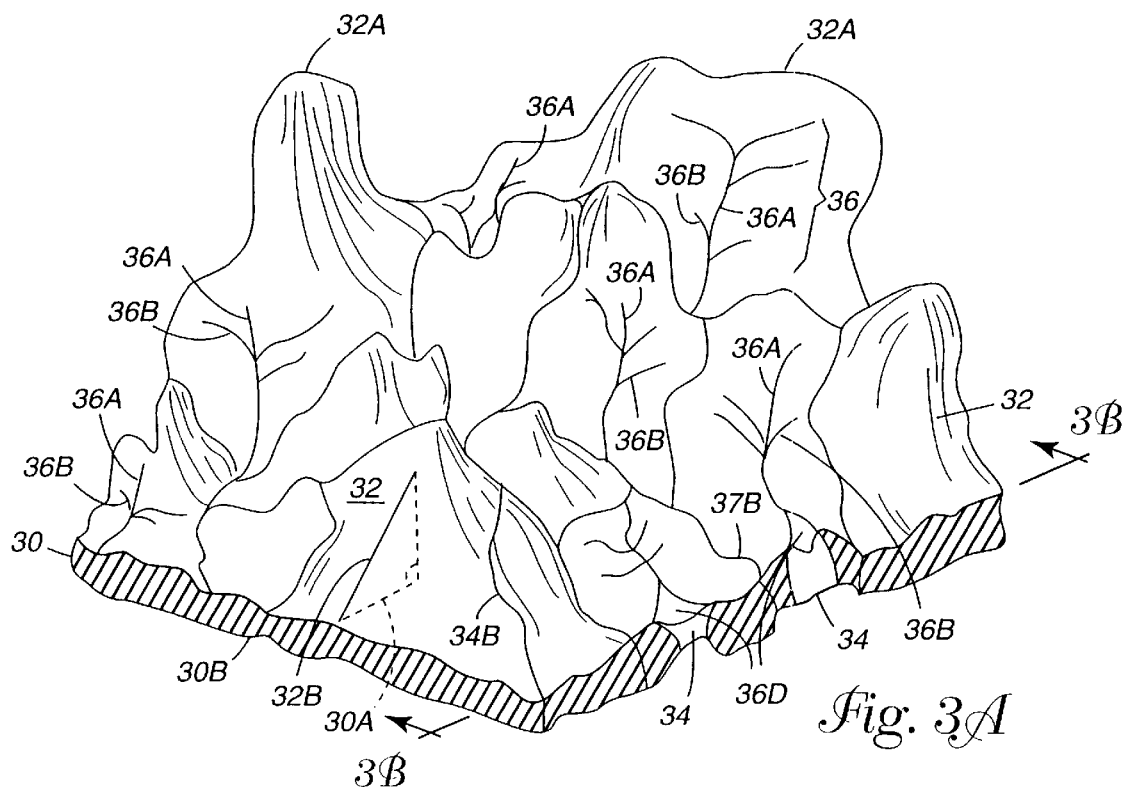
FIG. 3A shows perspective view of a broken away region of a flavor producing plate of the present invention wherein the upper major surface is covered with ridged protuberances having downward sloping surfaces. The protuberances are randomly disposed to form an overlapping covering of the plate surface (vertical scale is expanded).
Figure 3B:
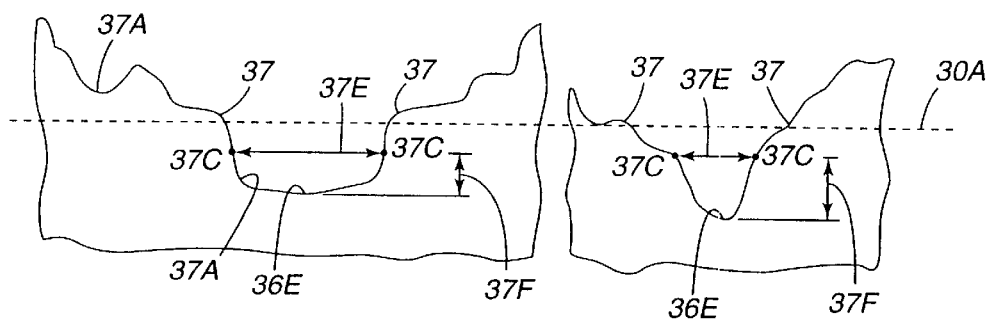
FIG. 3B shows an end view along section B—B of FIG. 3A (vertical scale is greatly expanded).

FIGS. 3A and 3B show perspective and end views respectively of a broken out interior region of an unsymmetrical embodiment of the invention wherein ridged protuberances, having irregular cross-sectional contours are arrayed in a random covering of substrate (30) in the plane of the upper major surface (30A). In this embodiment of the invention, protuberances (32) have ridged tops (32A) and downward sloping surfaces (32B).

Networks of concave channels (36) disposed on the downward sloping surfaces of the protuberances (32B) comprise the conveyance means for ridged embodiments of the invention. The networks fan-out at higher elevations into increasing numbers of smaller channels (36A) from branching interconnections (36B) among larger channels therebelow thus enabling the networks to drain progressively larger protuberance covered areas of the upper major surface. The lowest lying channel termini (36D), lying beneath the plane of upper major surface (30A), define the location of through-openings (34) shown cut-through by interior section B—B. Since there are larger numbers of smaller channels at higher elevations that empty into larger channels as they descend over protuberance surfaces, clearly only some of the channels in the network can terminate at through-openings (34).

Channels (36) have a width-to-depth ratio preferably exceeding 1.5, more preferably exceeding 2.0, and most preferably exceeding 2.5. The channel width (37E) at inflection points (37C), and depth (37F) to channel bottom (36E) are shown in FIG. 3B and define the dimensions used to calculate the width-to-depth ratio.

Because the edges and corners formed at the intersections of planer protuberances faces produce a jagged surface topology, this intersection angularity must be smoothed away, i.e., the sharp edges and pointed corners of exterior angles of ridged protuberances and the interior angles of channels are smoothed and rounded, thus providing a surface contour that is easier to clean. For example, angularities (37) formed at the intersection of protuberance and channel planer surfaces are rounded. The radii of curvatures of the roundings of angles formed at interior intersections (37A) preferably exceed 2 millimeters, more preferably exceed 4 millimeters, and most preferably exceed 5 millimeters. The radii of curvatures of the roundings of angles formed at exterior intersections (37B) preferably exceed 1 millimeter, more preferably exceed 2 millimeters, and most preferably exceed 4 millimeters.

The slope at the inflection point (37C) joining convex protuberance with concave channel (36E) cross-sectional contours is in the range of from about 1/10 to about 3/1. The slope of the downward sloping protuberance surfaces (32B) are measured over spans five-millimeter span in computing the slope allows for the presence of networks of drainage channels (36) and other small-scale artifacts or imperfections on the downward sloping surfaces of protuberances. If the protuberances covering the upper major surface are spaced apart as shown in FIG. 2, the plane of the upper major surface (20A) is readily apparent. However, if the protuberances are densely packed (as shown in FIGS. 1A and 3A), the plane of the upper major surface can be ill defined. In such instances, the planes of upper major surfaces (10A & 30A) are defined as the planes spaced at the equivalent plate thickness above the planes of lower major surfaces (10B & 30B). The equivalent plate thickness can be readily calculated using the procedure of Example 1, and the planes of the lower major surfaces are well defined because they are substantially smooth.

More preferred channel drained embodiments of the invention comprise replacing the ridged protuberances shown in FIG. 3A with the ellipsoidal protuberances (or protuberances formed from other surfaces of revolution) shown in FIG. 1A. In such embodiments, plate cleanability is improved especially when protuberance and channel cross-sections are arcuate. Protuberances (32) roughly correspond to the "hills" and channels (36) roughly correspond to the "valleys" used to described the upper surface of the prior art heat sink plate disclosed in U.S. Pat. No. 3,745,912 the disclosure of which is hereby incorporated by reference.

Figure 4:
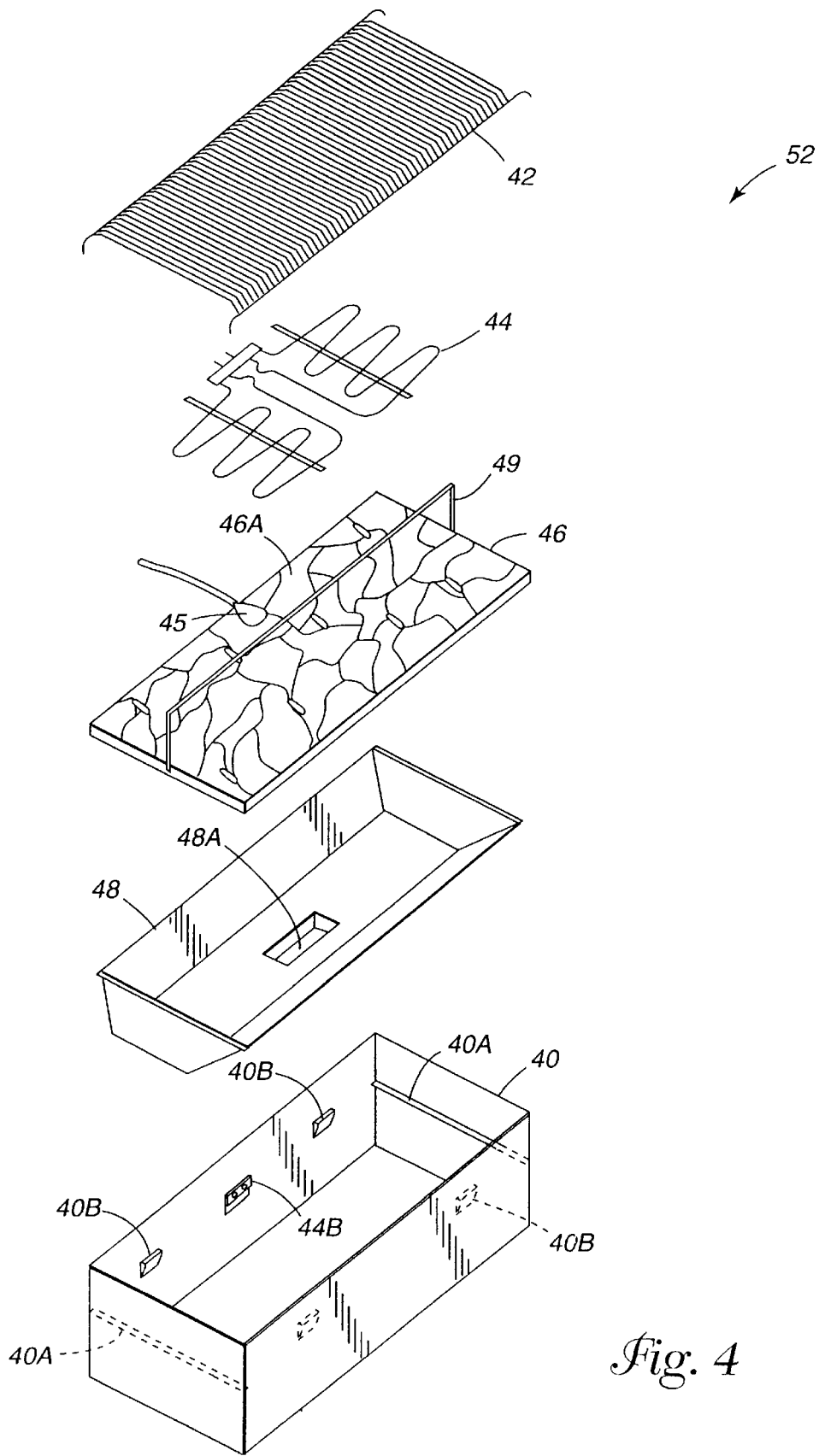
FIG. 4 shows an exploded perspective view of a grill assembly utilizing the inventive flavor producing plates.

FIG. 4 shows an exploded perspective view of a grill assembly having frame (40) adapted to support following components in a vertically stacked configuration: food rack (42), electric resistance heating element (44), the inventive flavor producing plate (46) shown in FIG. 3, and drip pan (48). The components are supported by ribs (40A) or lugs (40B), which for the sake of simplicity are shown only for flavor producing plate (46). Food rack (42) is topmost in the stack of grill assembly components. Heating element (44) is positioned beneath food rack (42) and above flavor producing plate (46). It plugs into and can be supported in cantilevered fashion by mating electric connector (44B) attached to frame wall or optionally supported by plate handle (49). During operation, element (44) radiatively heats both food placed on food rack (42) and flavor producing plate major surface (46A). Heating element (44) equipped with optional temperature sensor (45) is positioned in proximity to upper major surface (46A). The temperature sensor can be a thermocouple (having electronic control unit not shown) or bi-metal thermal sensing switch. Drip pan (48) having depression for removable and disposable sump (48A), made of aluminum foil, for example, is positioned bottom most in the stack. Frame (40) and drip pan (48) can be formed from sheet metal such as stainless steel, cold rolled steel, galvanized steel, or aluminum which may optionally have porcelain enamel or PTFE coatings applied thereto using methods appropriate for each of the specific metals well-known to those skilled in the metal finishing art.

The temperature at the flavor producing plate major surface (46A) is controlled by a combination of the following: the electrical input power to heating element (44); convective air flow (forced and free) around and through the flavor producing plate, the vertical spacing between the stacked components as pre-determined by frame wall ribs (40A) or lugs (40B); and temperature sensor (45) with associated control unit. Consequently, during grilling the temperature of the drippings at flavor producing plate major surface (46A) is regulated to a temperature that is above the pyrolysis temperature of food drippings but below the thermal decomposition temperature of PTFE coatings. The range of this temperature window is from about 150 to 300 degrees centigrade (300 to 570 degrees Fahrenheit).

Figure 5:
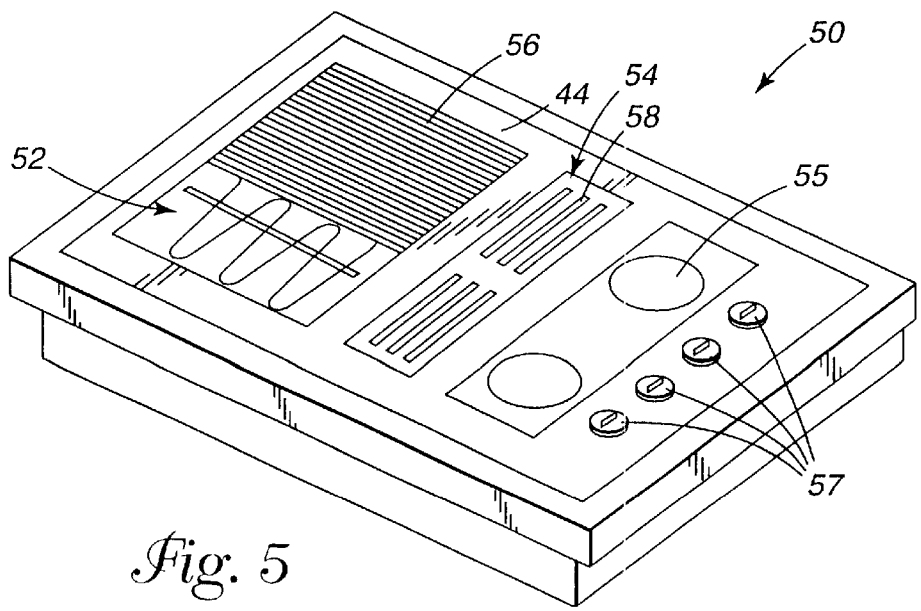
FIG. 5 shows a perspective view with parts broken away of a downdraft cooktop having the barbecue grill assembly of FIG. 4, and exhaust unit installed therein.

FIG. 5 shows a perspective view with parts broken away of a down-draft cooktop (50) adapted to support barbecue grill assembly (52) shown in detail in FIG. 4 and exhaust unit (54) in side-by-side configuration wherein the food rack (56) of the grill assembly and air intake (58) of the exhaust unit are substantially flush with the surface of the cooktop (50). Also shown are cooktop burners (55) and control knobs (57). The vertically stacked configuration of grill assembly (52) provides easy removal and re-insertion in cooktop (50). Details of exhaust unit (54) are outside the scope of the present invention. However, at a minimum the exhaust unit includes an exhaust fan, filter capable of trapping grease aerosols, and air ducts to convey heat, smoke, and odors outdoors. Exhaust units suitable for use in the barbecue assemblies of the present invention are similar to those described in U.S. Pat. Nos. 3,444,805, 3,474,724, 3,745,912, 4,862,795, and 5,287,799.

The flavor producing plates shown in FIGS. 1A–1E, 2, and 3A & 3B can be made by first casting, or otherwise forming the substrate (complete with raised regions, channels, and through openings) followed by cleaning and priming the substrate. The PTFE coatings containing optional particles can be applied to cover either the entire substrate or can be limited to the upper major surface. The coatings are oven dried and cured as described in further detail hereinbelow.

Substrates

Substrates are molded from cast molten metals such as iron, aluminum, copper, and bronze using casting methods and molds well known in the metal casting art. Sintered substrates can be pressed in molds from powdered metal using powder metallurgy process known in the art. Such powder pressing processes are useful for making porous substrates; that have uniform pore size. Porous plates intended for use without PTFE coatings are not preferred because pores increase the contact surface area and adhesion between char deposits and the substrate surface thus impeding cleaning.

Porous substrates are preferred when the plates are to be coated with PTFE because the larger area of interfacial contact (18C) (as shown in FIG. 1C) increases adhesion between the metal substrate and polymeric PTFE coating. Sandblasting or otherwise roughening the substrate surface can also increase the interfacial contact area.

The molds used in casting or pressing the substrates define the size (and therefore the heat capacity) and design of the major surface, protuberances, channels, and through openings. Thinner substrates having lower areal heat capacities can be prepared by metal stamping and related methods well known in the art. Similarly, the dies used in stamping the substrates define the size (and therefore the heat capacity) and design of the upper major surface, protuberances, channels, and through openings.

Operating Characteristics of Substrate Metals

Molar heat capacities at constant pressure, molecular weights, densities, and calculated specific heats, thermal conductivities, and emissivities of suitable substrate materials are given in Table I.

TABLE I

| Substrate Material | Heat Capacity at 600° K.[1] (Joules/mole/° K.) | Density[1] (gm/cm$^3$) | Specific Heat at 600° K. (Joules/gram/° K.) | Thermal Conductivity[2] (Watts/cm/° K.) | Emissivity[3] |
|---|---|---|---|---|---|
| Iron | 32.0 | 7.86 | 0.573 | 2.04 (pure) | 0.20–0.31[4] |
| Aluminum | 27.9 | 2.70 | 1.03 | 0.73 (pure) | 0.60–0.70[5] |
|  |  |  |  | 0.59 (wrought iron)[6] |  |
| Copper | 26.5 | 8.96 | 0.417 | 3.86 (pure) | 0.78 (oxidized) |

[1]) Data taken from Lange's Handbook of Chemistry, Fourteenth ed. (1992)
[2]) Data taken from Heat Transfer, J. P Hohnan, Fourth ed. (1976), Table A-2, pages 496–498
[3]) Data taken from Heat Transfer, J. P Holman, Fourth ed. (1976), Table A-10, pages 505–509
[4]) Heavily oxidized
[5]) Wrought iron, 0.5% cabon
[6]) Cast iron, turned and heated, emissitivity at 1620–1810 degrees Fahrenheit (880–990 degrees centigrade)

To insure rapid pyrolysis, the inventive plates should have high heat capacity and provide excellent heat transfer. High heat capacity assures that a large flow of food drippings does not cool the plate below the pyrolysis temperature during cooking. Consequently, substrates should have areal heat capacities in the range of from 500 to 3,000 (preferably 800 to 1,800) joules per square centimeter of plate major surface at a temperature of 260 degrees centigrade (500 degrees Fahrenheit).

The areal heat capacity is defined as $Q_A = 53.3 \times$ substrate specific heat (joules per gram per degree centigrade)× substrate density (grams per cubic centimeter)× substrate thickness (millimeters). For a given substrate material, $Q_A$ is directly proportional to thickness. If the substrate is cast iron, for example, $Q_A$ (cast iron)=240× thickness (millimeters). If the substrate has through openings or has an irregular surface, such as the heat sink plate of U.S. Pat. No. 3,745,912 for example, an equivalent substrate thickness can be determined by first weighing the plate, then dividing the weight by the substrate density to determine the equivalent substrate volume, and finally dividing the equivalent volume by plate area (length x width) thus yielding the equivalent thickness (See Example—#1).

Anti-Stick Coatings Useful in Practicing the Invention

The preferred anti-stick coating useful in practicing the invention is poly(tetrafluoroethylene)(PTFE). However the use of poly(tetrafluoroethylne-co-hexafluoropropylene) (FEP) is contemplated as falling within the scope of the present invention. PTFE coatings are noted for their low surface energy (slipperiness) and high thermal stability.

A family of PTFE anti-stick coatings having increasing durability, toughness, and reinforcement useful in practicing the present invention are commercially available as the Teflon®, Silverstone®, Silverstone®Xtra, SupraSelect®, and Autograph® systems from DuPont Fluoroproducts, Wilmington, Del. 19880. Waterbased suspensions of PTFE are available from DuPont under the trade name T30. Waterbased suspensions of FEP are available from DuPont under the trade name TE 9075.

Waterbased PTFE suspensions can be prepared by addition polymerization of tetrafluoroethylene monomer using suspension and/or emulsion polymerization methods well known in the art. A summary of process details is provided by G. G. Odian in *Principles of Polymerization*, (Third Edition), pages 301–353.

Particle Containing PTFE Suspensions

Water based suspensions of silica and alumina particles can be mixed in the desired proportion with the PTFE, suspensions described above to produce particle containing PTFE suspensions useful in the practice of the invention. Such aqueous silica particle suspensions useful in the practice of the invention are available from DuPont under the tradename LUDOX. Colloidal silica particle suspensions having particle sizes of 60 and 75 nanometers are available under the trade names of Nalco® 1060 and Nalco®2329 respectively from Nalco Chemical Co., Naperville, Ill. 60563.

Alternatively, sprayable waterbased dispersions of reinforcing particles can be readily prepared by dispersing powders of the desired particles using high-shear mixing, milling, and grinding methods well known in the art. The resulting particle dispersions comprise water dilutable blends of PTFE and PFE suspensions, surfactants, and viscosity modifiers. The preparation of suitable primer, midcoat, and topcoat particle containing dispersions are described in U.S. Pat. Nos. 5,198,491 (Example 5) and 5,250,356 the disclosures of which are hereby incorporated by reference.

Sources of Particle Powders

Particle powders suitable for practice of the present invention are available from a wide range of commercial sources. For example, specialty particles having carefully controlled size distributions are available from Nanophase Technologies Corp., Burr Ridge, Ill. 60521. Exemplary sources of bulk powders follow.

Silica particles having chemically modified surfaces that improve their dispersablity and incorporation in coatings are commercially available as the: Cab-O-Sil® series from Cabot Corp., Tuscola, Ill. 61953; the AeroSil™ series from Degussa Corp.; Ridgefield Park, N.J. 07660; and Sil-co-Sil™ from U.S. Silica, Inc., Berkeley Springs, W.V. 25411.

Suitable alumina particles are available from Degussa; Alcoa, Pitt., Pa. 15219; and DuPont (White Pigments and Mineral Products); Wilmington Del. 19880.

Suitable mica particles are available from Franklin Industrial Minerals, KMG Div., Kings Mountain, N.C. 28086 and Mearl Corp., Peekskill, N.Y. 10566. Suitable sources of titanium dioxide particles include R960 available from DuPont and the Titanox™ Series available from Titanium Pigment Corp. Suitable glass beads are available from Potters Industries, Inc., Valley Forge, Pa. 19482; Cataphoto Division of Ferro Corp., Jackson, Miss. ; and Flex-o-lite, Inc., Saint Louis, Mo. Suitable carbon blacks are available from Cabot Corp. and Colombian Carbon Corp. PTFE powder having an average particle diameter of from 3 to 4 micrometers is available under the trade name Hostaflon TFVP 9202 from Hoechst AG.

Operating Characteristics of the PTFE Coating

PTFE loses weight when heated above about 200 degrees centigrade, but the loss remains small up to about 350 degrees centigrade. Since PTFE has a crystalline melt transition temperature (TM) of 327 degrees centigrade, it can be used at temperatures up to 300 degrees centigrade for long periods without loss of strength. PTFE transmits infrared radiation in the range of from 2.5 to 7.5 micrometers and from 20 to 40 micrometers. It absorbs in the range of from 7.5 to 20 micrometers. Therefore PTFE coatings have minimal impact on radiation heat transfer at the flavor producing plate surface at source temperatures of the electric heating elements typically used in barbecue grills.

The coatings should not impede heat flow from the substrate to the drippings thereby slowing pyrolysis. The thermal conductivities of PTFE and FEP are $6 \times 10^{-4}$ and $5.9 \times 10^{-4}$ calories per square centimeter per second per degree centigrade per centimeter respectively as listed the *Polymer Handbook*, Edited by J. Bandrup and E. H. Immergut, (1966 ed.), pages IX-3 and IX-4. In other units, the thermal conductivities of PTFE and FEP are $2.51 \times 10^{-3}$ and $2.47 \times 10^{-3}$ watts per centimeter per degree Kelvin respectively. The coating thicknesses contemplated in practicing the present invention are from about 10 to about 100 micrometers. The heat transfer through a 100-micrometer thick coating of PTFE or FEP is therefore about 35 watts per square centimeter for a temperature differential of 140 degrees Kelvin.

The thermal conductivity of particle containing PTFE coatings will be approximately equal to the thermal conductivity of PTFE coatings without particles when the particle concentration is below the critical pigment volume concentration. When the particle concentration is at or above the critical pigment volume concentration, the thermal conductivity will be lower than the thermal conductivity of the particle network due to thermal contact resistance between particles.

Inclusion of white pigments of small particle size can increase the diffuse reflectance of particle containing PTFE coatings thus lowering the equilibrium operating temperature at the plate upper major surface. Increased reflectance also makes the grill more energy efficient by directing more heat energy toward the food being cooked. However, this assumes that such surfaces can be effectively cleaned and the whiteness restored between uses.

Processes for Applying PTFE Anti-Sick Coatings

First, substrates are roughened as disclosed above. Primers can also be used to improve interfacial contact and bonding between substrate and coating. One suitable primer for PTFE coatings is Polyflon Enamel™ EK-1909 BKN available from Daikin Industries Ltd., Osaka, Japan. Primers having microporous surfaces can be made using the fugitive methods disclosed in U.S. Pat. No. 4,917,960 (Example 5). This example describes decomposition of acrylic resin to create a porous, rough, high surface area primer with pore sizes in the range of from 20 to 60 micrometers that is suitable for bonding PTFE coatings.

The substrate surface can also be hardened using processes like, electric arc spraying, air impingement of alumina, or anodizing (in the case of aluminum substrates) as described in U.S. Pat. No. 5,455,102. Hardening the sub-surface layer under a PTFE coating can significantly increase its adhesion and durability.

The PTFE suspensions described above are formulated to be spray applied using wet pressure spray processes (compressed air actuated paint spray guns, for example). The PTFE coatings can also be applied by dip coating. Water based thickeners or viscosity modifiers can be added to adjust the rheology thus providing the desired wet film coating thicknesses. Single or multiple layers may be applied to achieve the desired coating thickness. The wet film coatings are dried at 90 to 150 degrees centigrade (195 to 300 degrees Fahrenheit) for 5 to 10 minutes, and cured at 400 to 420 degrees centigrade (750 to 790 degrees Fahrenheit), for 3 to 5 minutes. Conventional convection, infrared, gas, or electrically heated ovens can be used to dry and cure PTFE primers and coatings. Further coating process details are contained in U.S. Pat. Nos. 5,455,102 and 5,283,121 the disclosures of which are hereby incorporated by reference. Coatings containing glass beads should be formulated so that they can be diluted and applied to yield coatings where the beads are from 60 to 90% imbedded.

Operation of the Invention

Applicant believes the invention operates as follows. Upon pre-heating to the desired operating temperature, the food to be barbecued is placed on the food rack (42) and the cooking process commences. Since heating element (44) is positioned directly beneath the food and above the plate, radiant heat from the top surface of the heating element impinges upon the food unimpeded. Heat from the bottom surface impinges on the plate surface and is subsequently reflected or reradiated upward to aid in cooking. Therefore, the radiative and reflective heat transfer properties of the upper plate surface and coatings applied thereto are optimized to redirect heat upward where it can contribute to cooking. Minor amounts of heat are supplied by forced convection resulting from upward airflow through the grill assembly induced by exhaust unit (54). As the food heats up, drippings are rendered from the food which fall through the food rack, minor amounts of drippings are immediately pyrolyzed by direct contact with heating element (44); however, most the drippings fall onto flavor producing plate (46).

For purposes of this invention, food drippings are defined as juices, grease, fat, or water rendered from food in the process of being cooked during the barbecue process. The flavor producing plates of the present invention can be used to barbecue fruits, vegetables, breads, in addition to meat. When barbecuing such foodstuffs, some vegetable oil, olive oil, butter, margarine, sauce, marinade, etc. is frequently used in cooking. Such addenda increase the volume of drippings, which contribute to the build up of char on the flavor producing plate (especially when sauces containing sugar or corn syrup are used). When barbecuing meat, a substantial portion of the juices will be flammable liquid fat or grease. The volume of drippings build rapidly early in the cooking process and then gradually tail off as the food becomes fully cooked. The drippings are cool having a temperature of about 50 to 60 degrees centigrade (120 to 140 degrees Fahrenheit).

As the drippings fall onto plate surface, pyrolysis and spattering (associated with violent boiling of the water contained in the drippings) produce the aromatic aerosols (smoke) that are carried upward to flavor the food. The aerosols must form early in the cooking process so that the food has time to become fully flavored before it is overcooked. Plate design affects the dynamics of pyrolysis. For example, the surface topography of the upper plate surface must be designed to accommodate the changing volume of drippings falling on the plate surface. First, the topography must provide for effective formation and drainage of liquid films. Protuberance geometry, choice of covering array, and packing density (in concert with dripping viscosity and surface tension considerations) determine the dynamics of film formation, thickness, and drainage that in turn determine the rate of pyrolysis as the film flows over the plate surface enroute to the drip pan. Increasing the packing density increases the total protuberance surface area exposed to drippings (thus increasing plate film forming capacity). Similarly, channel and cranny dimensions are selected to accommodate the maximum flow of drippings to prevent flooding and cooling of the plate. Secondly, the heat transfer process accompanying pyrolysis is important and extremely complex. For example, the violent boiling of the water portion of the drippings produces a thin film of vapor (steam) of rapidly varying thickness immediately adjacent the plate surface which affects heat transfer dynamics. However, the following general observations are relevant. The heat capacity of the plate must heat the drippings above, rather than cool the plate below, the pyrolysis temperature. If the heat capacity is too low, the drippings cool the plate and delay the onset of pyrolysis. Therefore, the inventive plates must have areal heat capacities in the range set forth hereinabove, which are sufficiently large to rapidly pyrolyze drippings during the period of maximum flow. When present, the liquid film on the plate surface will absorb a portion of the radiant heat emitted by the heating element that would otherwise be reflected. This absorbed energy will heat the film aiding pyrolysis; however, overall cooling will dominate if plate heat capacity is too low. The thermal resistance of the optional PTFE coating is negligible at the thicknesses contemplated for use in practicing the invention. However, char formation reduces heat transfer and pyrolysis, i.e. especially previously formed char that could not be removed during cleaning.

Wood smoke enhances the flavoring power of the aerosols. Therefore, optional water soaked wood chips, such as hickory, apple, and mesquite, for example, can be sprinkled on the flavor producing plate during pre-heating. The chips smolder producing flavorful smoke that mixes with and augments the flavoring aerosols.

The temperature of PTFE coated flavor producing plates must be controlled to prevent overheating and decomposition of the PTFE. The art has failed to recognize and appreciate the existence of a "temperature window" above the pyrolysis temperature of food drippings but below the decomposition temperature of poly(tetrafluoroethylene) (PTFE). Within this window a PTFE coated flavor producing plate can be safely operated without thermally decomposing the coating.

Plates that reflect or re-radiate substantial amounts of heat impinging upon the plate surface from above operate at lower surface temperatures than if heated from below, and therefore have wider operating temperature windows.

During cooking, the flow of ambient air into the exhaust unit cools the food being cooked and prolongs the cooking process; therefore, it is oftentimes convenient to cover the food with an appropriately sized pan, preferably a disposable aluminum foil pan (not shown), to trap heat and flavoring aerosols around the food.

Plate topologies having high symmetry can potentially scatter radiant heat energy impinging thereon in preferred directions. Preferential scattering could generate local hot spots within the grill assembly shown in FIG. 4. The location of such hot spots depends on the spacing and geometry of grill components. The hot spots are easily detected, and the heat can then be reflected toward the food rack or removed through convective or conductive cooling.

EXAMPLES

Example 1
Determination of Areal Heat Capacity of Heat Sink Plates

A pair of flavor producing plates as described in U.S. Pat. No. 3,745,912 were removed from a Plug-in Grill Assembly "Energy-Saver" Model A151 available from JennAir Corp., Indianapolis, Ind. 46226. Since the plates had irregular surface contours and contained a number of through openings, it was necessary to calculate an equivalent plate thickness. Therefore, each plate was weighed on a triple beam balance. The weights were 1994.2 grams and 1975.8 grams. Since the perimeter of the plates was slightly irregular, the length and width of the plates were measured at several locations with a tape measure. The results were averaged to provide an average plate length and width, which were found to be 24.1 and 20.3 centimeters (cm) respectively. Using the density of cast iron listed in Table I as 7.86 grams per cubic centimeter. The equivalent thickness in millimeters (mm) was calculated using the following formula:

Equivalent thickness (mm)=[weight (grams)×10]÷[7.86×length (cm)×width (cm)]

The plates had calculated equivalent thicknesses of 5.19 and 5.14 millimeters and areal heat capacities of 240×5.19= 1245 and 240×5.14=1234 joules per square centimeter respectively.

Example 2
Determination of Temperature at Heat Sink Plate Upper Surface

Pork chops basted with Thai Chili Sauce were broiled on a JennAir Grill-Range Model S160 equipped with Plug-in Grill Assembly "Energy-Saver" Model A151 available from JennAir Corp., Indianapolis, Ind. 46226. The Grill Assembly (similar to that shown in FIG. 4) was equipped with a 2800 watt electric heating element and a pair of heat sink plates as described in U.S. Pat. No. 3,745,912. During broiling the chops were covered to prevent cooling by ambient air flowing over the food rack enroute to the exhaust unit. Within 10 seconds of turning off the heating element at the conclusion of cooking, food rack (42) was quickly removed and the temperature at the exposed upper surface of the flavor producing plate was measured with an Omega surface contact temperature probe and found to be 355 degrees Fahrenheit (180 degrees centigrade). The charred meat and chili sauce drippings were difficult to remove (and indeed could not be removed from highly sloped channels) after first soaking in a hot solution of Cascade automatic dishwasher detergent (available from Procter and Gamble) followed by scrubbing with a brass bristle grill brush.

This example shows that the steady-state temperature during grilling is below the 300-degree centigrade maximum continuous use temperature for PTFE coatings.

While in accordance with the Patent Statues, a specific embodiment of the present invention has been illustrated and described herein, it is realized that numerous modifications and changes will occur to those skilled in the art. It is therefore to be understood that the appended claims are intended to cover all such modifications and changes as fall with the true spirit and scope of the invention.

What is claimed is:

1. An easily cleanable flavor producing plate for a barbecue grill comprising a metal substrate having upper and lower major surfaces, said upper major surface including:
   a) convex protuberances projecting above the plane of said upper major surface, said protuberances having overlapped bases and individually defined tops formed from surfaces of revolution with downward sloping surfaces; wherein the intersection of merged protuberances define locations of crannies and interstices between protuberances:
   b) through-openings connecting said upper and lower major surfaces; said interstices defining the location of said through-openings,
   c) means for conveying food drippings falling on said upper major surface to said through-openings;
wherein:
   d) the major dimension of said through openings is in the range of from 12 to 30 millimeters,
   e) the slope of said downward sloping surfaces in the range of from 1/10 to 3/1, and
   f) said conveyance means comprises drainage of drippings from protuberance surfaces into crannies that discharge into through-openings located within said interstices.

2. The flavor producing plate of claim 1, further comprising a polytetrafluoroethylene coating applied to said substrate.

3. The flavor producing plate of claim 2, wherein said polytetrafluoroethylene coating further comprises reinforcing particles.

4. The plate of claim 1, wherein:
   a) the bottoms of said crannies are rounded,
   b) said rounded cranny bottoms have radii of curvatures exceeding 2 millimeters,
   c) said rounded crannies have a width-to-depth ratio exceeding 1.5,
   d) the slope at the inflection point of said rounded cranny cross-sectional contours is less than 3/1.

5. A barbecue grill assembly comprising a frame adapted to support the following components in a vertically stacked configuration:
   a) a food rack,
   b) an electric resistance heating element,
   c) a flavor-producing plate further comprising a metal substrate having upper and lower major surfaces, said upper major surface including:
      i) convex protuberances protecting above the plane of said upper major surface, said protuberances having overlapped bases and individually defined tops formed from surfaces of revolution with downward sloping surfaces: wherein the intersection of merged Protuberances define locations of crannies and interstices between protuberances:
      ii) through-openings connecting said upper and lower major surfaces; said interstices defining the location of said through-openings,
      iii) means for conveying food drippings falling on said upper major surface to said through-openings;
      wherein the major dimension of said through openings is in the range of from 12 to 30 millimeters, the slope of said downward sloping surfaces in the range of from 1/10 to 3/1, and said conveyance means comprises drainage of drippings from protuberance surfaces into crannies that discharge into through-openings located within said interstices;
      iv) a polytetrafluoroethylene coating applied to said substrate,
   d) a drip pan,
said configuration establishing a pre-determined vertical spacing between said components, wherein said food rack is positioned topmost in said stack, said heating element is positioned beneath said food rack, said flavor-producing plate is positioned beneath said heating element, and said drip pan positioned beneath said plate, whereby during grilling, food placed on the food rack generates drippings that drain through said heating element over said flavor-producing plate forming a char layer thereon, and collect in said drip pan; and said pre-determined vertical spacing maintains the temperature during grilling at said flavor-producing plate major surface above the pyrolysis temperature of said food drippings and below the decomposition temperature of said polytetrafluorothylene coating.

6. The grill assembly of claim 28, wherein said polytetrafluoroethylene coating further comprises reinforcing particles.

7. An electric range comprising the grill assembly of claim 5.

8. An electric cooktop comprising the grill assembly of claim 5.

* * * * *